US012509017B2

(12) United States Patent
Zhang

(10) Patent No.: US 12,509,017 B2
(45) Date of Patent: Dec. 30, 2025

(54) CAR SEAT AND AUTOMATIC BELT ADJUSTMENT APPARATUS THEREOF

(71) Applicant: Bambino Prezioso Switzerland AG, Steinhausen (CH)

(72) Inventor: Daliang Zhang, Steinhausen (CH)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 186 days.

(21) Appl. No.: 18/550,694

(22) PCT Filed: Apr. 8, 2022

(86) PCT No.: PCT/EP2022/059500
§ 371 (c)(1),
(2) Date: Sep. 15, 2023

(87) PCT Pub. No.: WO2022/214683
PCT Pub. Date: Oct. 13, 2022

(65) Prior Publication Data
US 2024/0140357 A1    May 2, 2024

(30) Foreign Application Priority Data

Apr. 9, 2021   (CN) .......................... 202120731254.6

(51) Int. Cl.
*B60R 22/357*   (2006.01)
*B60R 22/10*    (2006.01)
*B60R 22/34*    (2006.01)

(52) U.S. Cl.
CPC .......... *B60R 22/357* (2013.01); *B60R 22/105* (2013.01); *B60R 2022/3421* (2013.01)

(58) Field of Classification Search
CPC ..... B60R 22/347; B60R 22/44; B60R 22/357; B60R 22/105; B60R 2022/3421

(Continued)

(56) References Cited

U.S. PATENT DOCUMENTS 3,765,700 A * 10/1973 Littmann ............... B60R 22/341
                                                              280/805
3,915,402 A * 10/1975 Takada .................. B60R 22/357
                                                              297/476

(Continued)

FOREIGN PATENT DOCUMENTS

CN    203255134 U    10/2013
CN    203332037 U    12/2013

(Continued)

OTHER PUBLICATIONS

International Search Report and Written Opinion for Application No. PCT/EP2022/059500 dated Aug. 3, 2022.

(Continued)

*Primary Examiner* — Jose V Chen
(74) *Attorney, Agent, or Firm* — Volpe Koenig

(57) ABSTRACT

An automatic belt adjustment apparatus includes a fixing buckle, a belt buckle, a belt retractor, and a position switching member. The belt buckle is configured to be buckled with the fixing buckle. The belt retractor is connected to the other end of the belt. The belt retractor includes a locking assembly configured to selectively limit the belt retractor from automatically retracting the belt. The position switching member is movably disposed on at least one of the fixing buckle and the base, and configured to selectively drive the locking assembly to switch between a first position and a second position. When the position switching member drives the locking assembly to switch to the second position, the locking assembly is refrained from limiting the belt retractor from automatically retracting the belt.

21 Claims, 9 Drawing Sheets

(58) Field of Classification Search
USPC .......................................................... 297/476
See application file for complete search history.

(56) References Cited

U.S. PATENT DOCUMENTS

| | | | |
|---|---|---|---|
| 5,511,856 A | 4/1996 | Merrick et al. | |
| 5,549,356 A * | 8/1996 | Gray | B60N 2/2839 |
| | | | 297/484 |
| 5,704,684 A * | 1/1998 | Dukatz | B60R 22/357 |
| | | | 297/238 |
| 5,799,894 A | 9/1998 | Kohlndorfer et al. | |
| 6,045,194 A * | 4/2000 | Kielwein | B60R 22/36 |
| | | | 297/479 |
| 6,302,489 B1 * | 10/2001 | Coppo | B60R 22/40 |
| | | | 297/480 |
| 6,371,563 B1 | 4/2002 | Washizuka | |
| 6,454,200 B1 * | 9/2002 | Lacconi | B60R 22/34 |
| | | | 242/379 |
| 7,384,014 B2 * | 6/2008 | Ver Hoven | B60R 22/415 |
| | | | 280/806 |
| 7,837,275 B2 * | 11/2010 | Woellert | B60R 22/105 |
| | | | 297/475 |
| 2010/0123349 A1 * | 5/2010 | Murakami | B60R 22/34 |
| | | | 242/396.5 |
| 2013/0140869 A1 * | 6/2013 | Uchibori | B60R 22/34 |
| | | | 242/383.1 |
| 2017/0144624 A1 | 5/2017 | Geist et al. | |
| 2018/0236969 A1 | 8/2018 | Michel | |
| 2019/0031139 A1 | 1/2019 | Liteplo et al. | |
| 2021/0078460 A1 * | 3/2021 | Greenberg | B60R 22/26 |
| 2021/0138998 A1 * | 5/2021 | Zhang | B60N 2/2812 |
| 2023/0331185 A1 * | 10/2023 | Flaherty | B60R 22/105 |
| 2024/0101002 A1 * | 3/2024 | Zhao | B60R 2/26 |

FOREIGN PATENT DOCUMENTS

| | | |
|---|---|---|
| EP | 0709264 A1 | 5/1996 |
| GB | 2175194 A | 11/1986 |
| TW | 433217 U | 5/2001 |
| WO | 9624507 A1 | 8/1996 |
| WO | 2006044559 A2 | 4/2006 |
| WO | 2021094305 A1 | 5/2021 |

OTHER PUBLICATIONS

Taiwanese Office Action for Application No. TW111113389 dated Dec. 22, 2022. English Translation Included.

* cited by examiner

CAR SEAT AND AUTOMATIC BELT ADJUSTMENT APPARATUS THEREOF

CROSS REFERENCE TO RELATED APPLICATIONS

This application is a 371 National Stage application of International Patent Application No. PCT/EP2022/059500, filed on Apr. 8, 2022, which claims priority to Chinese Patent Application No. 2021207312546, entitled "CAR SEAT AND AUTOMATIC BELT ADJUSTMENT APPARATUS THEREOF" and filed on Apr. 9, 2021, which are incorporated herein by reference in their entirety.

TECHNICAL FIELD

The present disclosure relates to children's products, and more particular, to a car seat and an automatic belt adjustment apparatus thereof.

BACKGROUND

To maximize the safety of riding motor vehicles, it is necessary for children aged 0 to 12 to use car seats, making car seats more and more common in use.

When using a car seat, parents need to consider not only safety but also convenience. Therefore, for children of different ages and body shapes, the belt on the car seat needs to be adjusted from time to time.

SUMMARY

According to some embodiments, an automatic belt adjustment apparatus and a car seat are provided.

An automatic belt adjustment apparatus includes a fixing buckle, a belt buckle, a belt retractor, and a position switching member. The fixing buckle is disposed on a base of the car seat. The belt buckle is connected to one end of the belt. The belt buckle is configured to be buckled with the fixing buckle. The belt retractor is connected to the other end of the belt and disposed on the base. The belt retractor includes a locking assembly configured to selectively limit the belt retractor from automatically retracting the belt. The position switching member is movably disposed on at least one of the fixing buckle and the base, and is configured to selectively drive the locking assembly to switch between a first position and a second position. When the position switching member drives the locking assembly to switch to the second position, the locking assembly is refrained from limiting the belt retractor from automatically retracting the belt.

A car seat includes a base, a belt, and the automatic belt adjustment apparatus described above.

Details of one or more embodiments of the present disclosure are provided in the accompanying drawings and descriptions below. Other features, objectives, and advantages of the present disclosure become apparent from the specification, the accompanying drawings, and the claims.

BRIEF DESCRIPTION OF THE DRAWINGS

To illustrate the technical solutions according to the embodiments of the present disclosure or in the related art more clearly, the accompanying drawings for describing the embodiments or the related art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
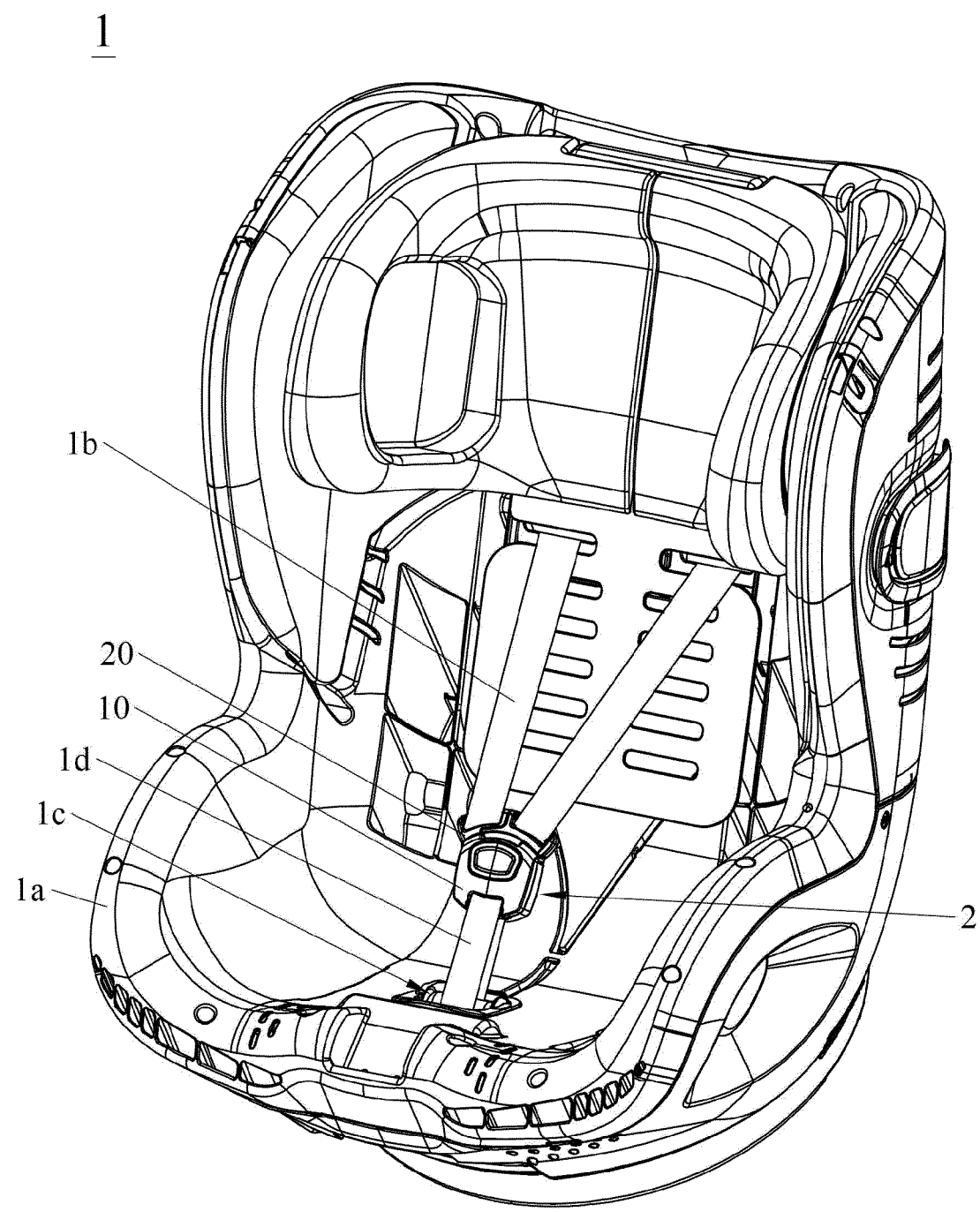
FIG. 1 is a perspective view of a car seat according to an embodiment of the present disclosure when a belt buckle is buckled with a fixing buckle.

However, a belt of a conventional car seat is often very troublesome to adjust. Since the belt extends from the bottom of the car seat and is exposed in front of the seat, when adjusting the length of the belt, it is necessary to manually pull the bottom of the belt, and rely on a webbing locking member therein for locking during the adjustment to a desired position. Such an adjustment method is very inconvenient and fails to meet current needs of people.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Accordingly, there is an urgent need for an automatic belt adjustment apparatus that can automatically adjust the length of the belt to overcome the shortcomings.

Referring to FIG. 1, a car seat 1 according to an embodiment of the present disclosure includes a base 1a, a belt 1b, and an automatic belt adjustment apparatus 2. A length of the belt 1b can be automatically adjusted by the automatic belt adjustment apparatus 2. Specifically, in FIG. 1, the car seat 1 further includes a fixing shaft 1c disposed on the base 1a, and a fixing belt 1d disposed between the fixing shaft 1c and a fixing buckle 10. The fixing buckle 10 is rotatably connected to the fixing shaft 1c via the fixing belt 1d, such that the fixing buckle 10 can rotate or move according to different needs, thereby improving the riding comfort of the car seat 1. In another embodiment, the fixing buckle 10 may be fixed to the base 1a. A specific structure of the automatic belt adjustment apparatus 2 will be described in detail below.

Figure 2:
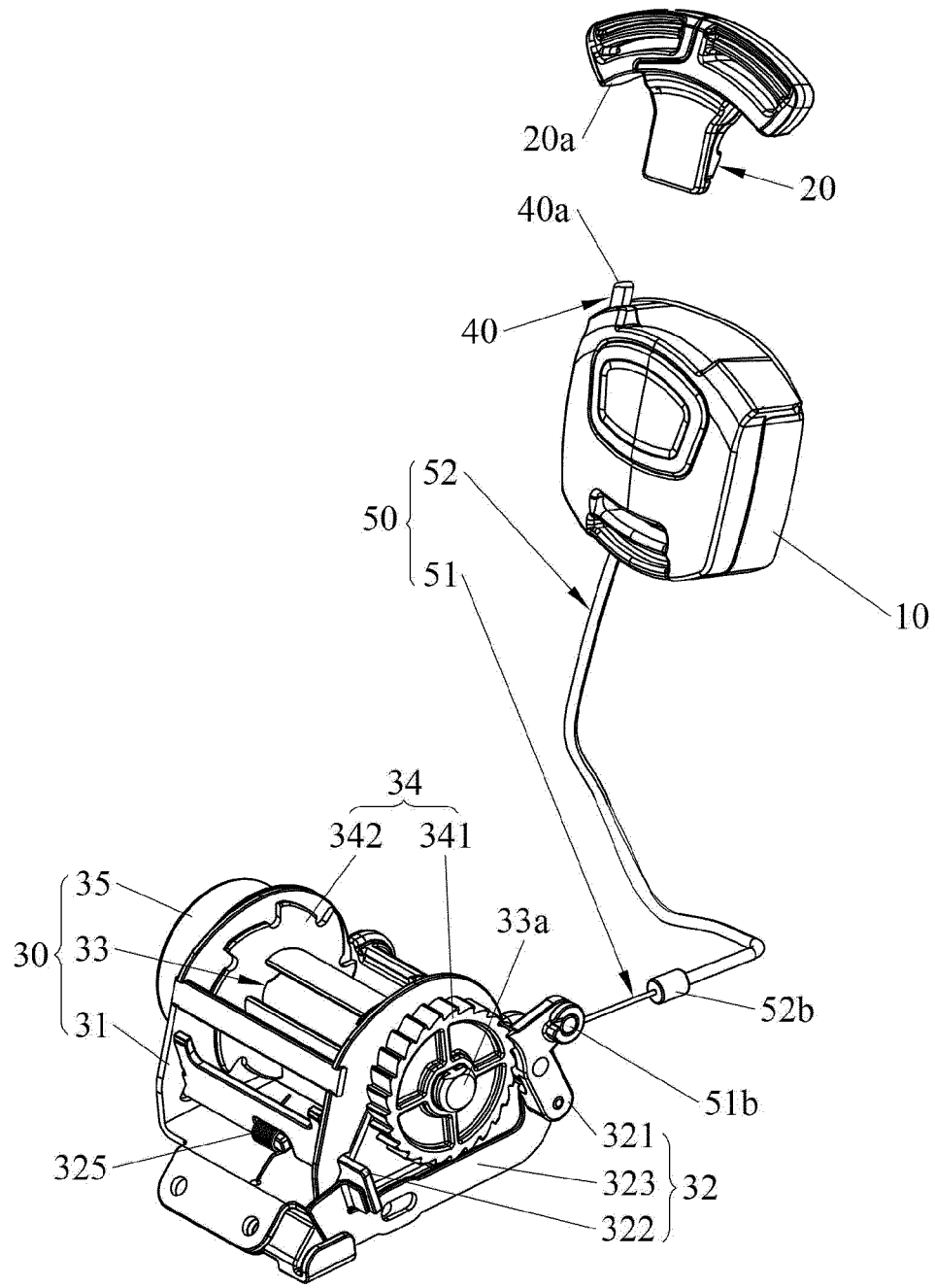
FIG. 2 is a perspective view of an automatic belt adjustment apparatus shown in FIG. 1.
Figure 3:
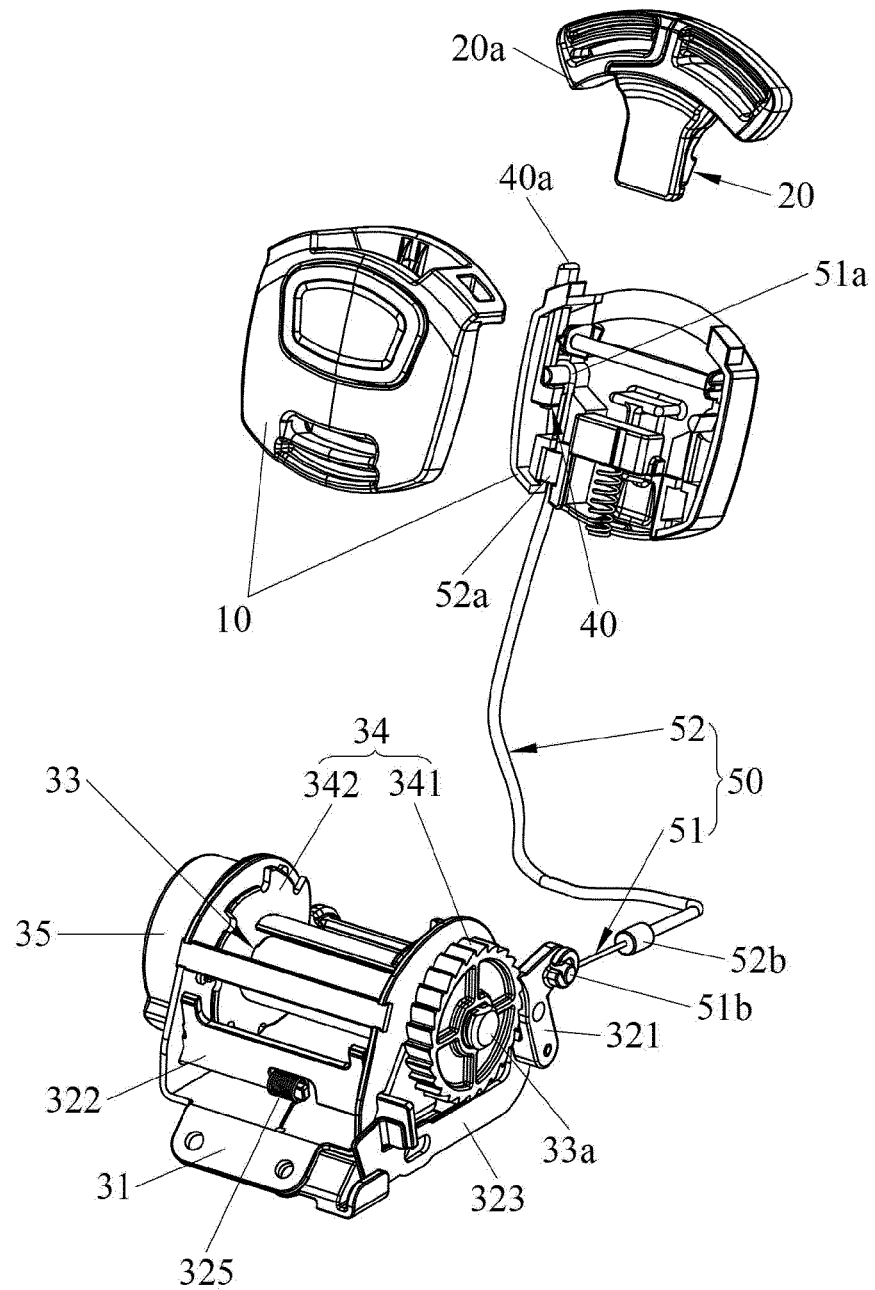
FIG. 3 is a perspective view of the automatic belt adjustment apparatus shown in FIG. 2 after the fixing buckle is disassembled.
Figure 4:
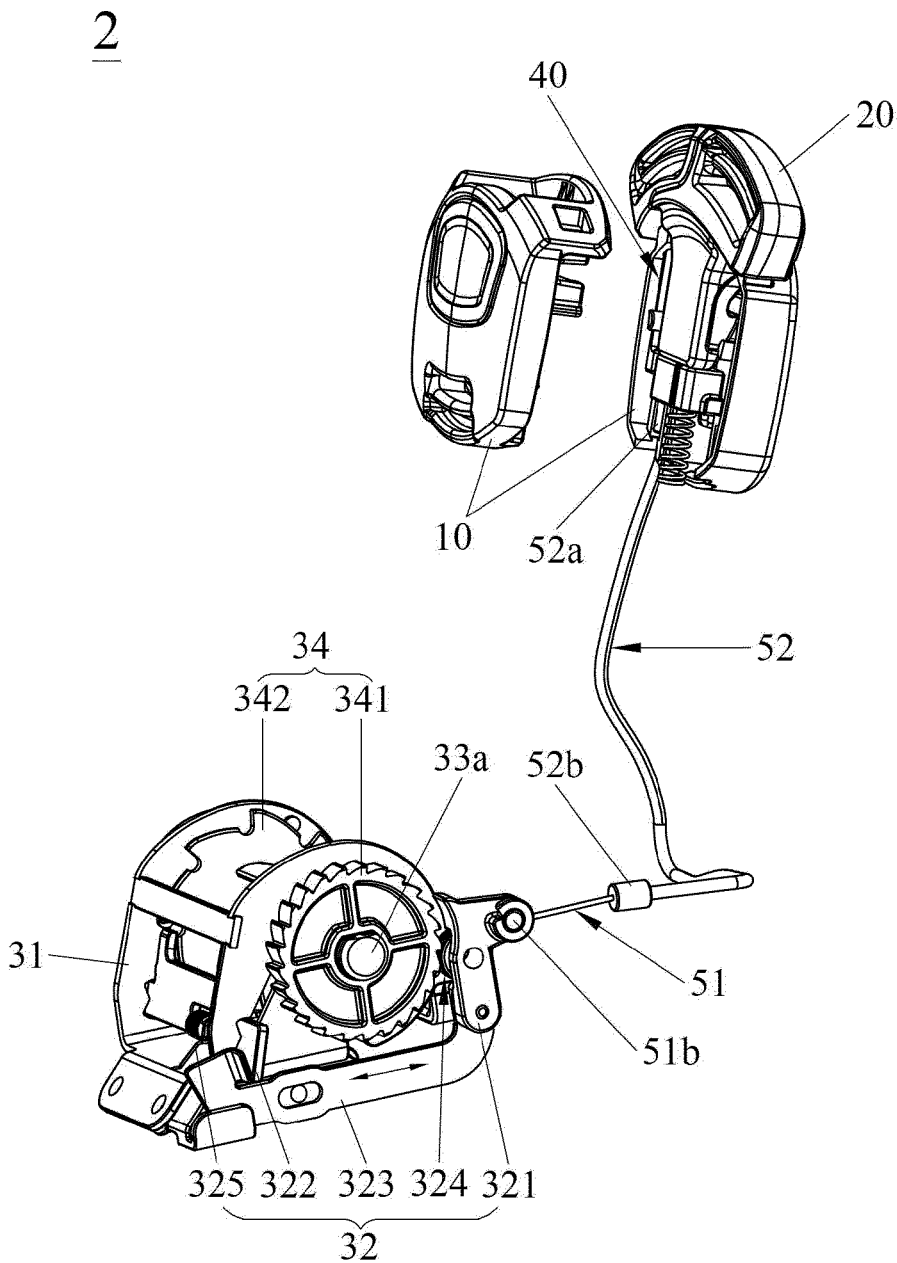
FIG. 4 is a perspective view of the automatic belt adjustment apparatus shown in FIG. 3 when the fixing buckle is buckled with the belt buckle.

As shown in FIG. 2 to FIG. 4, the automatic belt adjustment apparatus 2 includes a fixing buckle 10, a belt buckle 20, a belt retractor 30, and a position switching member 40. The fixing buckle 10 is disposed on the base 1a. For example, the fixing buckle 10 is rotatably connected to the fixing shaft 1c of the base 1a via the fixing belt 1d. The belt buckle 20 can be buckled with the fixing buckle 10. The belt buckle 20 is connected to one end of the belt 1b. The belt retractor 30 is connected to the other end of the belt 1b. The belt retractor 30 is disposed on the base 1a, such that it can retract the belt 1b. The belt retractor 30 includes a locking assembly 32 configured to selectively limit the belt retractor 30 from automatically retracting the belt 1b, such that the automatic belt adjustment apparatus 2 can selectively limit the automatic retraction of the belt 1b. In this embodiment, the position switching member 40 is movably disposed on the fixing buckle 10 and is exposed therefrom, and the position switching member 40 is configured to selectively drive the locking assembly 32 to switch between a first position shown in FIG. 3 and a second position shown in FIG. 4. When the position switching member 40 drives the locking assembly 32 to switch to the second position as shown in FIG. 4, the locking assembly 32 is refrained from limiting the belt retractor 30 from automatically retracting the belt 1b. Therefore, the purpose that the automatic belt adjustment apparatus 2 automatically adjusts the length of the belt 1b is achieved.

More specifically, as shown in FIG. 2 to FIG. 4, when the belt buckle 20 is buckled with the fixing buckle 10, the position switching member 40 disposed on the fixing buckle 10 is driven to drive the locking assembly 32 to move, such that the locking assembly 32 is switched from the first position shown in FIG. 3 to the second position shown in FIG. 4. Therefore, the automatic belt adjustment apparatus 2 automatically adjusts the length of excess belt 1b. It should be understood that in another embodiment, the position switching member 40 may be pressed by, for example, fingers of an operator to drive the locking assembly 32 to switch to the second position as shown in FIG. 4. When the belt buckle 20 is unbuckled from the fixing buckle 10, the position switching member 40 drives the locking assembly 32 to switch to the first position as shown in FIG. 3, such that the locking assembly 32 limits the belt retractor 30 from automatically retracting the belt 1b. In that case, the belt 1b cannot be automatically retracted. As shown in FIG. 3, the position switching member 40 is slidably disposed on the fixing buckle 10, such that the position switching member 40 is driven to move when the belt buckle 20 is buckled with the fixing buckle 10. In another embodiment, according to actual needs, the position switching member 40 may be rotatably disposed on the fixing buckle 10, as long as the position switching member 40 can drive the locking assembly 32 to switch between the first position and the second position.

As shown in FIG. 2 to FIG. 4, the belt retractor 30 includes a retractor mounting bracket 31, a locking assembly 32, a rotating shaft 33, a ratchet 34, and a retracting elastic member 35. The rotating shaft 33 is pivotally mounted on the retractor mounting bracket 31, and is configured to wind the belt 1b. The ratchet 34 is fixedly connected to the rotating shaft 33, such that the ratchet 34 rotates along with the rotating shaft 33. The locking assembly 32 is mounted on the retractor mounting bracket 31, and the locking assembly 32 is configured to be selectively engaged with the ratchet 34 to limit rotation of the rotating shaft 33. Therefore, the structure of the belt retractor 30 is more reasonable and compact. The retracting elastic member 35 is configured to drive the rotating shaft 33 to rotate toward a direction of automatically retracting the belt 1b, such that the rotating shaft 33 of the belt retractor 30 can automatically retract the belt 1b when the locking assembly 32 is disengaged from the ratchet 34.

In this embodiment, the locking assembly 32 includes a first locking member 321 and a second locking member 322 that are swingably mounted on the retractor mounting bracket 31. The ratchet 34 includes a first ratchet 341 and a second ratchet 342. The rotation of the rotating shaft 33 in a first direction (for example, a clockwise direction) is blocked and limited when the first locking member 321 is engaged with the first ratchet 341. The rotation of the rotating shaft 33 in a second direction (for example, a counterclockwise direction) opposite to the first direction is blocked and limited when the second locking member 322 is engaged with the second ratchet 342. For example, when the locking assembly 32 is switched to the first position as shown in FIG. 3, the first locking member 321 is engaged with the first ratchet 341, and the second locking member 322 is disengaged from the second ratchet 342. In that case, the rotating shaft 33 can only rotate counterclockwise to unwind the belt 1b that is wound on the rotating shaft 33. Therefore, when the belt buckle 20 is buckled with the fixing buckle 10, the belt 1b can be pulled out without being automatically retracted by the belt retractor 30. When the locking assembly 32 is switched to the second position as shown in FIG. 4, the first locking member 321 is disengaged from the first ratchet 341, and the second locking member 322 is engaged with the second ratchet 342. In that case, the rotating shaft 33 can only rotate clockwise to automatically wind the belt 1b. Therefore, after the belt buckle 20 is buckled with the fixing buckle 10, the belt 1b can be automatically retracted by the belt retractor 30, and cannot be pulled out, which ensures the safety of the use of the automatic belt adjustment apparatus 2. It should be understood that in other embodiments, the locking assembly 32 may be in a simple locking relationship with the belt retractor 30. That is, when the locking assembly 32 is locked with the belt retractor 30, the belt retractor 30 cannot rotate clockwise or counterclockwise. When the locking assembly 32 releases the belt retractor 30, the belt retractor 30 can rotate clockwise or counterclockwise. For a more detailed structure of the belt retractor 30, refer to the description below.

As shown in FIG. 2 to FIG. 4, the first ratchet 341 is fixed to a first axial direction end 33a of the rotating shaft 33, and is located outside the retractor mounting bracket 31. The second ratchet 342 is fixed to the rotating shaft 33, and is located inside the retractor mounting bracket 31. That is, positions of the first ratchet 341 and the second ratchet 342 on the rotating shaft 33 are displaced. The first locking member 321 is located on one side of the rotating shaft 33 (for example, a rear side in FIG. 2 to FIG. 4), and is adjacent to the first ratchet 341. The second locking member 322 is located on the other side of the rotating shaft 33 (for example, a front side in FIG. 2 to FIG. 4), and is adjacent to the second ratchet 342. As such, the first locking member 321 can be smoothly engaged with the first ratchet 341, and the second locking member 322 can be smoothly engaged with the second ratchet 342. Therefore, the arrangement of the rotating shaft 33, the first ratchet 341, the second ratchet 342, the first locking member 321, and the second locking member 322 is more reasonable and compact. Specifically, in order to enable the first locking member 321 and the second locking member 322 to move synchronously, referring to FIG. 2 through FIG. 4, the locking assembly 32 further includes a locking linking member 323 slidably disposed on the retractor mounting bracket 31, and the locking linking member 323 is located below the first ratchet 341. One end of the locking linking member 323 is connected to the first locking member 321, and the other end of the locking linking member 323 is connected to the second locking member 322, so as to achieve transmission between the first locking member 321 and the second locking member 322. Therefore, the locking assembly 32 can be smoothly switched between the first position shown in FIG. 3 and the second position shown in FIG. 4. More specifically, in FIG. 2, FIG. 3, and FIG. 4, one end of the locking linking member 323 is pivotally connected to the first locking member 321, and the other end of the locking linking member 323 abuts against the second locking member 322. Therefore, the locking linking member 323 is smoothly connected to the first locking member 321 and the second locking member 322, respectively. More specifically, in FIG. 2 to FIG. 4, a pivot point between one end of the locking linking member 323 and the first locking member 321 is located below a swing center of the first locking member 321. A connection point between a drive assembly 50 as described below and the first locking member 321 is located above the swing center of the first locking member 321. As such, a lever motion of the first locking member 321 can be enabled. Of course, according to the actual situations, the locking linking member 323 may be connected to the first locking member 321 and the second locking member 322 in other manners.

As shown in FIG. 4, the locking assembly 32 further includes a first elastic member 324 mounted between the retractor mounting bracket 31 and the first locking member 321. The first elastic member 324 is configured to drive the first locking member 321 to move in a direction of engaging with the first ratchet 341. As such, after the belt buckle 20 is unbuckled with the fixing buckle 10, the first locking member 321 can be driven by the first elastic member 324 to be engaged with the first ratchet 341, thereby driving the locking assembly 32 to switch from the second position shown in FIG. 4 to the first position shown in FIG. 3. In this embodiment, the first elastic member 324 is a torsion spring. In addition, the locking assembly 32 further includes a second elastic member 325 mounted between the retractor mounting bracket 31 and the second locking member 322. The second elastic member 325 is configured to drive the second locking member 322 to move in a direction of engaging with the second ratchet 342. As such, after the belt buckle 20 is buckled with the fixing buckle 10, the second locking member 322 can be driven by the second elastic member 325 to be engaged with the second ratchet 342. In this embodiment, the second elastic member 325 is a torsion spring.

As shown in FIG. 2 to FIG. 4, the automatic belt adjustment apparatus 2 further includes the drive assembly 50. The drive assembly 50 is disposed between the position switching member 40 and the locking assembly 32. The position switching member 40 is configured to drive the locking assembly 32 to switch between the first position shown in FIG. 3 and the second position shown in FIG. 4 through the drive assembly 50. Specifically, in FIG. 2 to FIG. 4, the drive assembly 50 includes a traction wire 51. One end 51a of the traction wire 51 is connected to the position switching member 40, and the other end 51b of the traction wire 51 is connected to the first locking member 321. When the belt buckle 20 is buckled with the fixing buckle 10, the position switching member 40 is driven to pull the traction wire 51, thereby driving the first locking member 321 connected to the traction wire 51 to swing in a direction of disengaging from the first ratchet 341. More specifically, as shown in FIG. 2 and FIG. 3, the belt buckle 20 includes a pushing structure 20a, and the position switching member 40 includes a pushed structure 40a matching with the pushing structure 20a. When the belt buckle 20 is buckled with the fixing buckle 10, the pushing structure 20a abuts against the pushed structure 40a, thereby driving the position switching member 40 to slide on the fixing buckle 10, so as to pull the traction wire 51. In addition, in order to make the traction wire 51 pull the first locking member 321 more smoothly, referring to FIG. 2 to FIG. 4, the drive assembly 50 further includes a fixing tube 52. The traction wire 51 extends through the fixing tube 52, one end 52a of the fixing tube 52 is fixed to the fixing buckle 10, and the other end 52b of the fixing tube 52 is fixed to the base 1a. In another embodiment, the fixing tube 52 may be omitted.

The working principle of the automatic belt adjustment apparatus 2 is described below with reference to FIG. 1 to FIG. 4. As shown in FIG. 2, in an initial state, since the first elastic member 324 drives the first locking member 321 to engage with the first ratchet 341, and the second locking member 322 is driven by the locking linking member 323 to disengage from the second ratchet 342, the rotation of the rotating shaft 33 in the first direction is blocked, and the rotating shaft 33 can only rotate in the second direction. Therefore, a user can pull out the belt 1b, while the belt retractor 30 cannot automatically retract the belt 1b at that time. When the user buckles the belt buckle 20 with the fixing buckle 10, the belt buckle 20 pushes the position switching member 40 to slide on the fixing buckle 10 by cooperation of the pushing structure 20a and the pushed structure 40a, such that the switching member 40 pulls the traction wire 51 to slide in the fixing tube 52, the first locking member 321 is then pulled by the traction wire 51 to swing in a direction of disengaging from the first ratchet 341. When the first locking member 321 swings in the direction of disengaging from the first ratchet 341, the first locking member 321 further drives the locking linking member 323 to slide. As such, the locking linking member 323 will no longer push the second locking member 322, and the second locking member 322 swings in the direction of engaging with the second ratchet 342 under the action of the second elastic member 325. Therefore, the rotating shaft 33 can rotate in the first direction, while the rotation of the rotating shaft 33 in the second direction is blocked, as shown in FIG. 4. In that case, the belt 1b can no longer be pulled out, and the rotating shaft 33 is driven by the retracting elastic member 35 to rotate in the first direction to wind the excess belt 1b, thereby automatically adjusting the length of the belt 1b.

Since the belt retractor 30 requires to automatically retract the belt 1b when the fixing buckle 10 is unbuckled with the belt buckle 20, in that case, the user can manually operate the position switching member 40 to slide within the fixing buckle 10, thereby pulling the traction wire 51 to slide within the fixing tube 52, and then pulling the first locking member 321 to swing in the direction of disengaging from the first ratchet 341. When the first locking member 321 swings in the direction of disengaging from the first ratchet 341, the first locking member 321 further drives the locking linking member 323 to slide. As such, the locking linking member 323 will no longer push the second locking member 322, and the second locking member 322 swings in the direction of engaging with the second ratchet 342 under the action of the second elastic member 325, until the locking assembly 32 is switched to the second position as shown in FIG. 4. In that time, the belt retractor 30 can automatically retract all the belts 1b that have been pulled out.

Referring to FIG. 5 to FIG. 9, a car seat 1' according to another embodiment is substantially the same as that of the car seat 1 according to the aforementioned embodiment, except that a different automatic belt adjustment apparatus is employed. Details of difference are described below:

(1) In this embodiment, the switching member 40' of the automatic belt adjustment apparatus 2' is movably disposed on the base 1a and is exposed therefrom, while in the aforementioned embodiment, the position switching member 40 of the automatic belt adjustment apparatus 2 is movably disposed on the fixing buckle 10.

Figure 8:
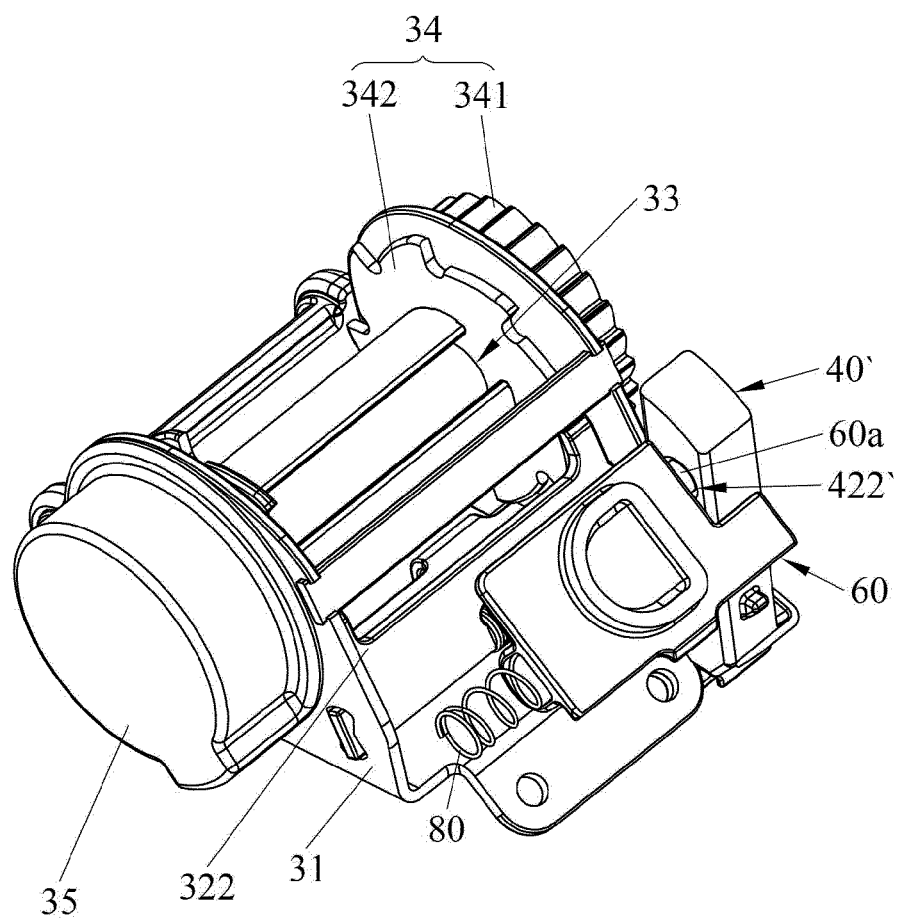
FIG. 8 is a perspective view of the automatic belt adjustment apparatus shown in FIG. 6 when the position switching member is switched to a fourth position.

(2) In this embodiment, the position switching member 40' is operated to drive the locking assembly 32 to switch to a fourth position as shown in FIG. 8; while in the aforementioned embodiment, the position switching member 40 is driven by the belt buckle 20 when it is buckled with the fixing buckle 10, such that the position switching member 40 drives the locking assembly 32 to switch to the second position as shown in FIG. 4.

Figure 6:
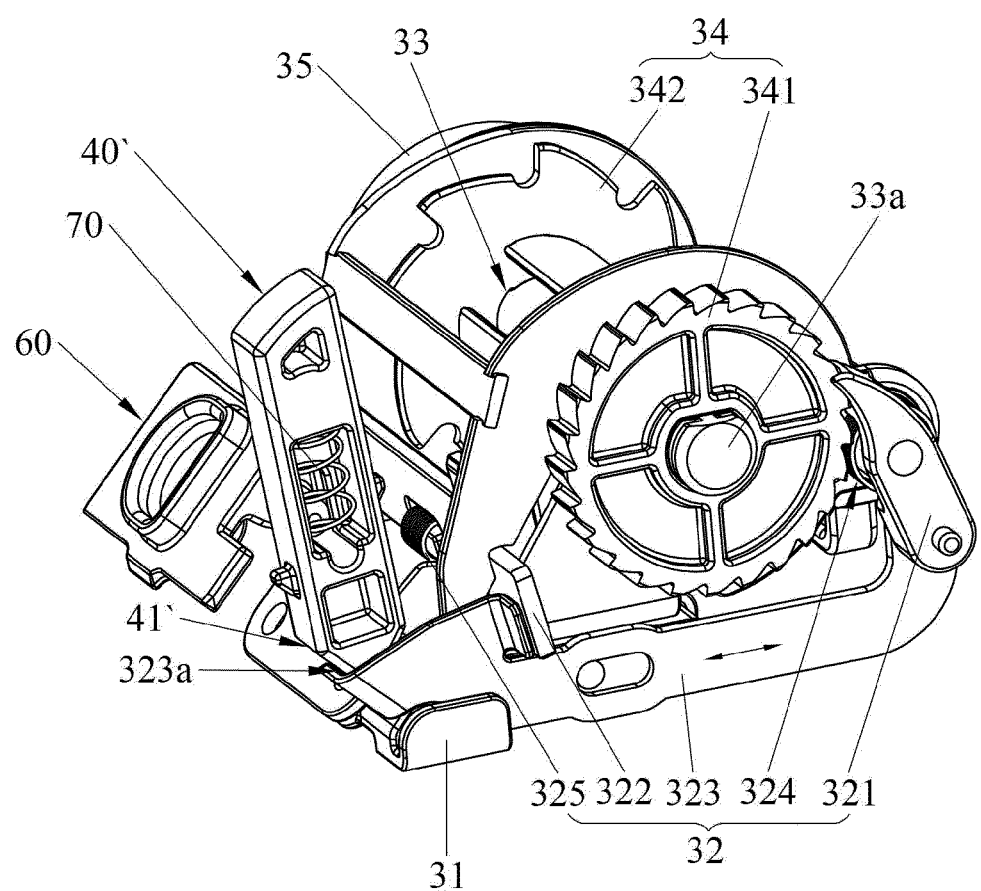
FIG. 6 is a perspective view of an automatic belt adjustment apparatus shown in FIG. 5 when a position switching member is switched to a third position.
Figure 9:
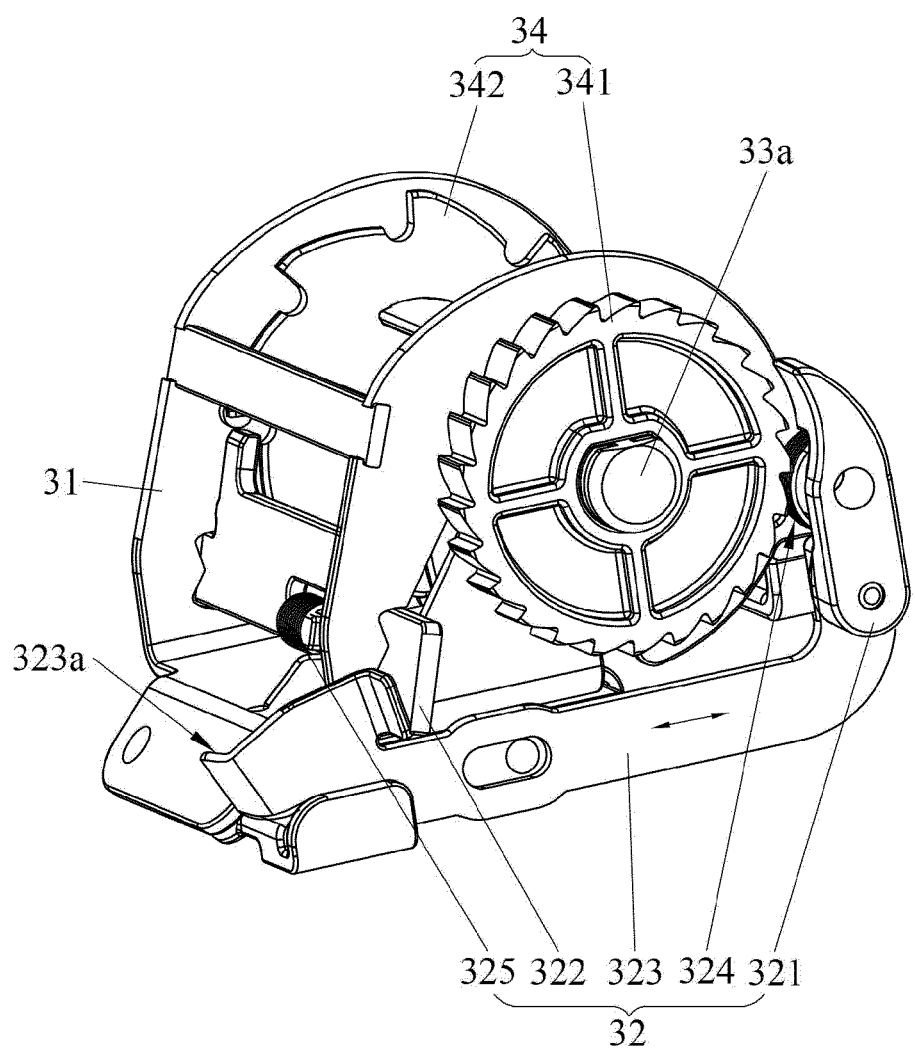
FIG. 9 is a perspective view of a belt retractor in FIG. 8.

(3) In this embodiment, the automatic belt adjustment apparatus 2' does not have a drive assembly. In that case, the position switching member 40' disposed on the base 1a can be switched between a third position shown in FIG. 7 and a fourth position shown in FIG. 8 relative to the base 1a. Specifically, in this embodiment, a lower end of the position switching member 40' includes a driving inclined surface 41', and the locking assembly 32 includes a driven inclined surface 323a matching with the driving inclined surface 41'. When switched to the fourth position as shown in FIG. 8, the position switching member 40' drives the locking assembly 32 to switch to the second position as shown in FIG. 9 by cooperation of the driving inclined surface 41' and the driven inclined surface 323a. More specifically, as shown in FIG. 6 and FIG. 9, the driven inclined surface 323a is formed on one end of the locking linking member 323, and the driven inclined surface 323a is inclined with respect to a sliding direction (refer to double arrows in the locking linking member 323 in FIG. 6 and FIG. 9) of the locking linking member 323. The driving inclined surface 41' is located between the driven inclined surface 323a and the rotating shaft 33, thus allowing the position switching member 40' to smoothly drive the locking assembly 32 to move, and making the arrangement between the position switching member 40' and the locking assembly 32 more reasonable and compact. Of course, the driven inclined surface 323a may be formed on the first locking member 321 or the second locking member 322, and the driving inclined surface 41' may be correspondingly disposed at another position. In the aforementioned embodiment, the automatic belt adjustment apparatus 2 includes the drive assembly 50, such that the position switching member 40 drives, via the drive assembly 50, the locking assembly 32 to switch to the second position shown in FIG. 4.

Figure 5:
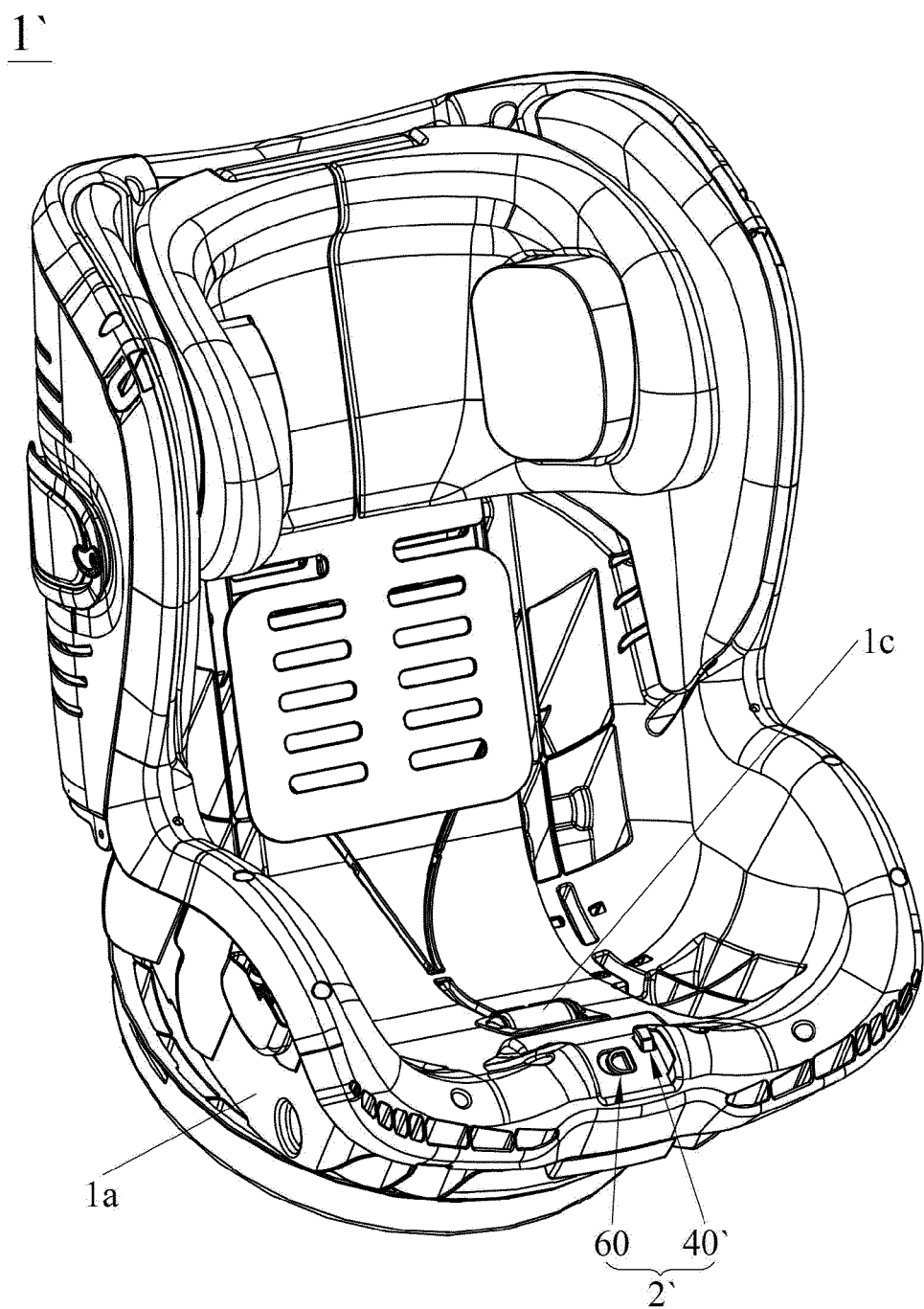
FIG. 5 is a perspective view of a car seat according to another embodiment of the present disclosure.
Figure 7:
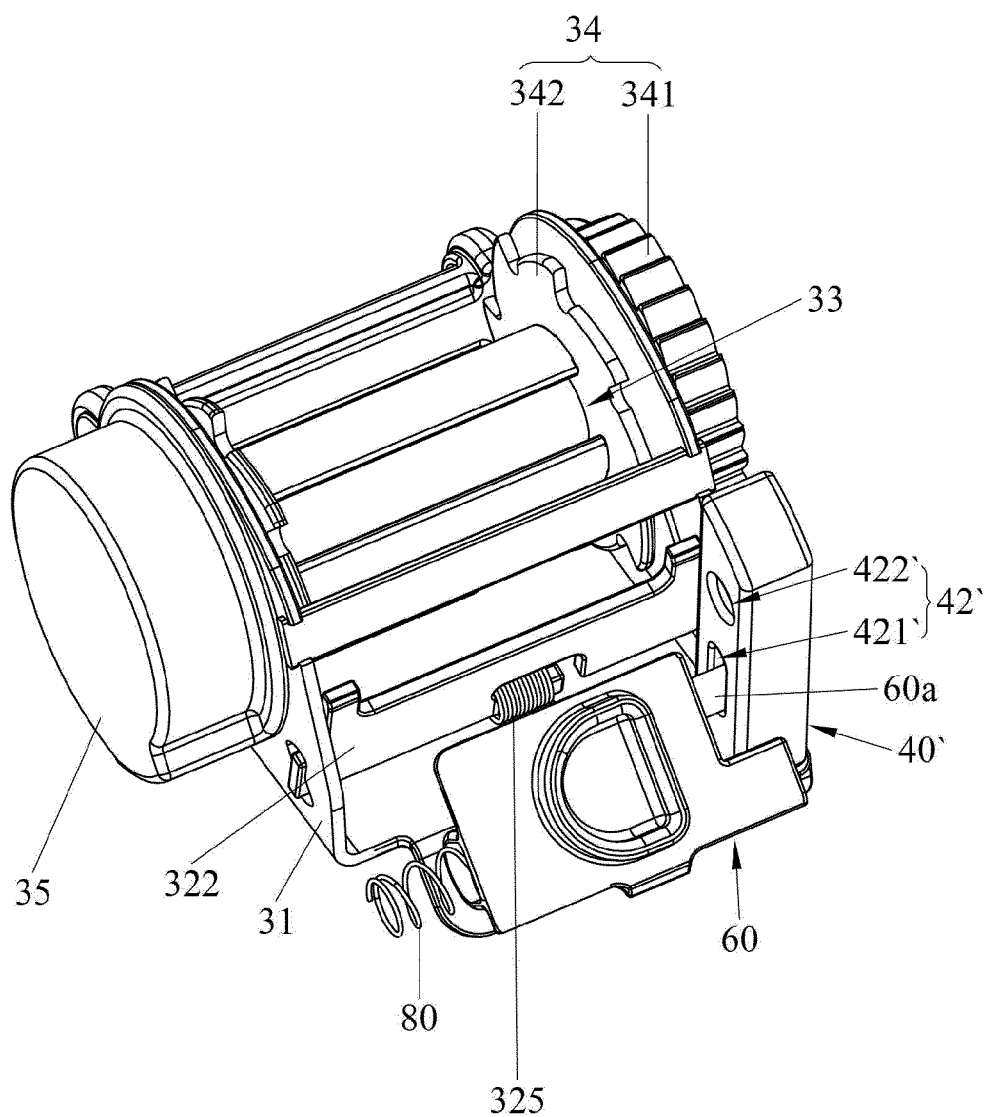
FIG. 7 is a perspective view of the automatic belt adjustment apparatus shown in FIG. 6 viewed from another aspect.

(4) In this embodiment, the automatic belt adjustment apparatus 2' further includes a position locking member 60. As shown in FIG. 5, the position locking member 60 is movably disposed on the base 1a. As shown in FIG. 7, the position locking member 60 includes a locking portion 60a, and the position switching member 40' includes an engagement portion 42' matching with the locking portion 60a. The locking portion 60a is locked with the engagement portion 42' when the position switching member 40' is switched to the third position as shown in FIG. 7 or the fourth position as shown in FIG. 8. Specifically, in this embodiment, the engagement portion 42' is a locking hole, and the locking portion 60a is a convex post that can extend into the locking hole, so as to ensure reliable locking between the locking portion 60a and the engagement portion 42', and make the arrangement between the position switching member 40' and the position locking member 60 more reasonable and compact. More specifically, in FIG. 7, the engagement portion 42' includes a first slot hole 421' and a second slot hole 422'. The locking portion 60a is locked in the first slot hole 421' when the position switching member 40' is switched to the third position as shown in FIG. 7, so as to prevent the position switching member 40' from being mistakenly operated to the fourth position as shown in FIG. 8 when the belt 1b is pulled out, and otherwise the pull-out of the belt 1b will be hindered. The locking portion 60a is configured to be locked in the second slot hole 422' when the position switching member 40' is switched to the fourth position as shown in FIG. 8, so as to lock the locking assembly 32 to the second position as shown in FIG. 9. As such, after the belt buckle 20 is unbuckled with the fixing buckle 10, the belt retractor 30 automatically retracts the belt 1b. Of course, according to the actual situations, the engagement portion 42' may include one or more slot holes.

(5) In this embodiment, the automatic belt adjustment apparatus 2' further includes a third elastic member 70. As shown in FIG. 6, the third elastic member 70 is disposed between the base 1a and the position switching member 40'. The third elastic member 70 is configured to drive the position switching member 40' to move to the third position as shown in FIG. 7. Specifically, in FIG. 6, the position switching member 40' is slidably disposed on the base 1a, for example, in an up-and-down inclined sliding arrangement. A sliding direction of the position switching member 40' intersects with a sliding direction of the locking linking member 323, thereby facilitating operating the position switching member 40'. Therefore, the arrangement between the position switching member 40' and the locking linking member 323 is more reasonable and compact.

(6) In this embodiment, the automatic belt adjustment apparatus 2' further includes a fourth elastic member 80. As shown in FIG. 7 and FIG. 8, the fourth elastic member 80 is disposed between the base 1a and the position locking member 60. The fourth elastic member 80 is configured to drive the locking portion 60a to lock with the engagement portion 42', such that the position locking member 60 is driven by the fourth elastic member 80 to automatically lock the position switching locking member 40'. Specifically, in FIG. 7, the position locking member 60 is slidably disposed on the base 1a, and a sliding direction of the position locking member 60 is parallel to an axial direction of the rotating shaft 33, thereby facilitating operating the position locking member 60. Therefore, the arrangement between the position locking member 60 and the belt retractor 30 is more reasonable and compact.

Except for the difference above, the automatic belt adjustment apparatus 2' in this embodiment has the same structure as the automatic belt adjustment apparatus 2 in the aforementioned embodiment, and details are not repeated herein.

The working principle of the automatic belt adjustment apparatus 2' will be described below with reference to FIG. 6 to FIG. 9. In an initial state, since the first elastic member 324 drives the first locking member 321 to engage with the first ratchet 341, and the second locking member 322 is driven by the locking linking member 323 to disengage from the second ratchet 342, the rotation of the rotating shaft 33 in the first direction is blocked, and the rotating shaft 33 can only rotate in the second direction, as shown in FIG. 6. Therefore, the user can pull out the belt 1b, and the belt retractor 30 cannot automatically retract the belt 1b. In that case, when the user slides the position locking member 60 in a direction away from the first slot hole 421', the locking portion 60a is disengaged from the first slot hole 421'. In addition, the user slides and switches the position switching member 40' to the fourth position as shown in FIG. 8, such that the position switching member 40' drives the locking linking member 323 to slide by cooperation of the driving inclined surface 41' and the driven inclined surface 323a. Therefore, the first locking member 321 is driven to swing in a direction of disengaging from the first ratchet 341, and the second locking member 322 swings in a direction of engaging with the second ratchet 342 under the action of the second elastic member 325, until the locking assembly 32 is switched to the second position as shown in FIG. 9. As such, the rotating shaft 33 can only rotate in the first direction, and the rotation of the rotating shaft 33 in the second direction is blocked. Next, the position locking member 60 is released, such that the locking portion 60a of the position locking member 60 is driven by the fourth elastic member 80 to be locked in the second slot hole 422'. Therefore, the state of the position switching member 40' is maintained. Since the locking assembly 32 is switched to the second position as shown in FIG. 9, the belt retractor 30 in that time can automatically retract the excess belt 1b, thereby automatically adjusting the length of the belt 1b.

When the belt buckle 20 is buckled with the fixing buckle 10, and after the belt retractor 30 automatically retracts the excess belt 1b, the position switching member 40' in the fourth position as shown in FIG. 8 can be switched to the third position as shown in FIG. 7, such that the belt 1b is not pulled out. In that case, the user slides the position locking member 60 in a direction away from the second slot hole 422', such that the position switching member 40' is driven by the third elastic member 70 to move to the third position as shown in FIG. 7. When the position switching member 40' slides to the third position as shown in FIG. 7, the first elastic member 324 drives the first locking member 321 to swing in a direction of engaging with the first ratchet 341, and at the same time, drives the locking linking member 323 to slide correspondingly, thereby pushing the second locking member 322 to swing in the direction of disengaging from the second ratchet 342. Finally, the locking assembly 32 is switched to the first position as shown in FIG. 6. Next, the user releases the position locking member 60, then the fourth elastic member 80 drives the locking portion 60a to be locked with the first slot hole 421', such that the position locking member 60 is locked at the third position as shown in FIG. 7.

Compared with the related art, the automatic belt adjustment apparatus 2 (2') described above includes the fixing buckle 10, the belt buckle 20, the belt retractor 30, and the position switching member 40 (40'). The belt buckle 20 is connected to one end of the belt 1b. The belt buckle 20 is buckled with the fixing buckle 10. The belt retractor 30 is connected to the other end of the belt 1b. The belt retractor 30 is provided with the locking assembly 32 configured to selectively limit the belt retractor 30 from automatically retracting the belt 1b. The position switching member 40 (40') is movably disposed on at least one of the fixing buckle 10 and the base 1a and is exposed therefrom, and the position switching member 40 (40') is configured to selectively drive the locking assembly 32 to switch between a first position as shown in FIG. 3 and a second position as shown in FIG. 4, and when the position switching member 40 (40') drives the locking assembly 32 to switch to the second position as shown in FIG. 4, the locking assembly 32 is refrained from limiting the belt retractor 30 from automatically retracting the belt 1b. Therefore, the belt retractor 30 in that case can automatically retract the belt 1b, such that the automatic belt adjustment apparatus 2 (2') can automatically adjust the length of the belt 1b. In addition, since the car seat 1 (1') includes the automatic belt adjustment apparatus 2 (2'), the car seat 1 (1') may also automatically adjust the length of the belt 1b.

It should be noted that, "the position switching member 40 (40') is exposed therefrom" described above means that: the position switching member 40 (40') disposed on the fixing buckle 10 and/or the base 1a is not covered by the fixing buckle 10 or the base 1a. For example. the position switching member 40 (40') is exposed in a convex manner and in a non-convex manner. The so-called non-convex manner means that the fixing buckle 10 or the base 1a is provided with an avoiding space for an operator to operate the position switching member 40 (40') from the outside of the fixing buckle 10 or the base 1a. In addition, although the position switching member 40 shown in FIG. 2 to FIG. 4 is disposed on the fixing buckle 10, and the position switching member 40' shown in FIG. 6 to FIG. 9 is disposed on the base 1a, in other embodiments, the automatic belt adjustment apparatus may include both the position switching member 40 disposed on the fixing buckle 10 and the position switching member 40' disposed on the base 1a according to actual needs.

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only describe several implementations of this application, and their description is relatively specific and detailed, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

The invention claimed is:

1. An automatic belt adjustment apparatus for a car seat, comprising:
   a fixing buckle disposed on a base of the car seat;
   a belt buckle connected to one end of a belt of the car seat, the belt buckle being buckled with the fixing buckle;
   a belt retractor connected to the other end of the belt and disposed on the base, the belt retractor comprising a locking assembly configured to selectively limit the belt retractor from automatically retracting the belt, a retractor mounting bracket, a rotating shaft for winding the belt, and a ratchet fixedly connected to the rotating shaft, the locking assembly and the rotating shaft are mounted on the retractor mounting bracket, and the locking assembly is selectively engageable with the ratchet to limit rotation of the rotating shaft in a first direction and in a second direction opposite to the first direction; and
   a position switching member movably disposed on at least one of the fixing buckle and the base, and configured to selectively drive the locking assembly to switch between a first position and a second position, and when the position switching member drives the locking assembly to switch to the second position, the locking assembly is refrained from limiting the belt retractor from automatically retracting the belt.

2. The automatic belt adjustment apparatus according to claim 1, wherein when the belt buckle is buckled with the fixing buckle, the position switching member disposed on the fixing buckle is driven to drive the locking assembly to move, such that the locking assembly is switched to the second position; or the position switching member disposed on the base is operated to drive the locking assembly to switch to the second position.

3. The automatic belt adjustment apparatus according to claim 1, wherein the locking assembly comprises a first locking member and a second locking member swingably mounted on the retractor mounting bracket, the ratchet comprise a first ratchet and a second ratchet, the first locking member is engageable with the first ratchet to limit rotation of the rotating shaft in a first direction, and the second locking member is engageable with the second ratchet to limit rotation of the rotating shaft in a second direction opposite to the first direction.

4. The automatic belt adjustment apparatus according to claim 3, wherein when the locking assembly is switched to the first position, the first locking member is engaged with the first ratchet, and the second locking member is disengaged from the second ratchet; and when the locking assembly is switched to the second position, the first locking member is disengaged from the first ratchet, and the second locking member is engaged with the second ratchet.

5. The automatic belt adjustment apparatus according to claim 3, wherein the first ratchet is located on one side of the retractor mounting bracket, the second ratchet is located on the other side of the retractor mounting bracket, the first locking member is located on one side of the rotating shaft and is adjacent to the first ratchet, and the second locking member is located on the other side of the rotating shaft and is adjacent to the second ratchet.

6. The automatic belt adjustment apparatus according to claim 3, wherein the locking assembly further comprises a locking linking member slidably disposed on the retractor mounting bracket and located below the first ratchet, one end of the locking linking member is connected to the first locking member, and the other end of the locking linking member is connected to the second locking member.

7. The automatic belt adjustment apparatus according to claim 6, wherein a sliding direction of the position switching member on the base intersects with a sliding direction of the locking linking member.

8. The automatic belt adjustment apparatus according to claim 3, wherein the locking assembly further comprises a first elastic member disposed between the retractor mounting bracket and the first locking member, and the first elastic member is configured to drive the first locking member to move in a direction of engaging with the first ratchet.

9. The automatic belt adjustment apparatus according to claim 3, wherein the locking assembly further comprises a second elastic member disposed between the retractor mounting bracket and the second locking member, and the second elastic member is configured to drive the second locking member to move in a direction of engaging with the second ratchet.

10. The automatic belt adjustment apparatus according to claim 1, wherein the belt retractor further comprises a retracting elastic member disposed between the rotating shaft and the retractor mounting bracket, and the retracting elastic member is configured to drive the rotating shaft to rotate toward a direction of automatically retracting the belt.

11. The automatic belt adjustment apparatus according to claim 1, further comprising a drive assembly disposed between the position switching member and the locking assembly, wherein the position switching member drives the locking assembly to switch between the first position and the second position via the drive assembly, wherein the position switching member is slidably disposed on the base.

12. An automatic belt adjustment apparatus for a car seat, comprising:
   a fixing buckle disposed on a base of the car seat;
   a belt buckle connected to one end of a belt of the car seat, the belt buckle being buckled with the fixing buckle;
   a belt retractor connected to the other end of the belt and disposed on the base, the belt retractor comprising a locking assembly configured to selectively limit the belt retractor from automatically retracting the belt;
   a position switching member slidably disposed on the base, and configured to selectively drive the locking assembly to switch between a first position and a second position, and when the position switching member drives the locking assembly to switch to the second position, the locking assembly is refrained from limiting the belt retractor from automatically retracting the belt; and
   a drive assembly disposed between the position switching member and the locking assembly, the position switching member drives the locking assembly to switch between the first position and the second position via the drive assembly,
   wherein the drive assembly comprises a traction wire, one end of the traction wire is connected to the position switching member disposed on the fixing buckle, the other end of the traction wire is connected to the first locking member, and when the belt buckle is buckled with the fixing buckle, the position switching member is driven to pull the traction wire, such that the first locking member connected to the traction wire is driven to swing in a direction of disengaging from the first ratchet.

13. The automatic belt adjustment apparatus according to claim 12, wherein the drive assembly further comprises a fixing tube, the traction wire extends through the fixing tube, one end of the fixing tube is fixed to the fixing buckle, and the other end of the fixing tube is fixed to the base.

14. The automatic belt adjustment apparatus according to claim 1, wherein the belt buckle comprises a pushing structure, the position switching member comprises a pushed structure matching with the pushing structure, and when the belt buckle is buckled with the fixing buckle, the position switching member is driven to move on the fixing buckle by cooperation of the pushing structure and the pushed structure.

15. An automatic belt adjustment apparatus for a car seat, comprising:
- a fixing buckle disposed on a base of the car seat;
- a belt buckle connected to one end of a belt of the car seat, the belt buckle being buckled with the fixing buckle;
- a belt retractor connected to the other end of the belt and disposed on the base, the belt retractor comprising a locking assembly configured to selectively limit the belt retractor from automatically retracting the belt; and
- a position switching member movably disposed on at least one of the fixing buckle and the base, and configured to selectively drive the locking assembly to switch between a first position and a second position, and when the position switching member drives the locking assembly to switch to the second position, the locking assembly is refrained from limiting the belt retractor from automatically retracting the belt,
- wherein the position switching member disposed on the base is capable of switching between a third position and a fourth position relative to the base, the position switching member comprises a driving inclined surface, the locking assembly comprises a driven inclined surface matching with the driving inclined surface, and when the position switching member is switched to the fourth position, the locking assembly is driven to switch to the second position by cooperation of the driving inclined surface and the driven inclined surface.

16. The automatic belt adjustment apparatus according to claim 15, further comprising a position locking member movably disposed on the base, wherein one of the position switching member and the position locking member is provided with a locking portion, the other one of the position switching member and the position locking member is provided with an engagement portion engaging with the locking portion, and when the position switching member is switched to the third position or the fourth position, the locking portion is locked with the engagement portion.

17. The automatic belt adjustment apparatus according to claim 16, wherein the engagement portion is a locking hole, and the locking portion is a convex post extending into the locking hole, wherein the driven inclined surface is formed on the locking linking member, the driven inclined surface is inclined relative to a sliding direction of the locking linking member, and the driving inclined surface is located between the driven inclined surface and the rotating shaft.

18. The automatic belt adjustment apparatus according to claim 16, wherein the belt retractor comprises a retractor mounting bracket, a rotating shaft for winding the belt, and a ratchet fixedly connected to the rotating shaft, the locking assembly and the rotating shaft are mounted on the retractor mounting bracket, and the locking assembly is selectively engaged with the ratchet to limit rotation of the rotating shaft, wherein the position locking member is slidably disposed on the base, and a sliding direction of the position locking member is parallel to an axial direction of the rotating shaft.

19. The automatic belt adjustment apparatus according to claim 15, further comprising a third elastic member disposed between the base and the position switching member, wherein the third elastic member is configured to drive the position switching member to move to the third position, wherein the automatic belt adjustment apparatus further comprises a fourth elastic member disposed between the base and the position locking member, wherein the fourth elastic member is configured to drive the locking portion to lock with the engagement portion.

20. A car seat, comprising a base, a belt, and the automatic belt adjustment apparatus according to claim 1.

21. The car seat according to claim 20, further comprising a fixing shaft disposed on the base and a fixing belt disposed between the fixing shaft and the fixing buckle, the fixing buckle being rotatably connected to the fixing shaft through the fixing belt.

* * * * *